(12) United States Patent
Wu et al.

(10) Patent No.: US 6,384,997 B1
(45) Date of Patent: May 7, 2002

(54) METHOD AND APPARATUS FOR SUSTAINING WRITE THROUGHPUT IN DISK DRIVES

(75) Inventors: Hsiang Chen Wu, Milpitas; Tainshain Lee, San Jose; Monica Kuan, Fremont; Wing Ying, Fremont, all of CA (US)

(73) Assignee: Maxtor Corporation, Longmont, CO (US)

(*) Notice: Subject to any disclaimer, the term of this patent is extended or adjusted under 35 U.S.C. 154(b) by 0 days.

(21) Appl. No.: 09/212,194

(22) Filed: Dec. 15, 1998

(51) Int. Cl.[7] .................................................. G11B 5/09
(52) U.S. Cl. ........................................ 360/46; 360/60
(58) Field of Search ................................ 360/77.08, 25, 360/31, 60, 53, 39, 46; 714/30, 8–11; 369/53, 54; 711/201, 114

(56) References Cited

U.S. PATENT DOCUMENTS 5,583,842 A * 12/1996 Wilson et al. ............. 360/75 X
5,818,654 A * 10/1998 Reddy et al. ................. 360/53
6,078,452 A *  6/2000 Kittilson et al. ............. 360/51

FOREIGN PATENT DOCUMENTS

JP      410162493    *  6/1998  ........... G11B/19/04

OTHER PUBLICATIONS

Microsoft Press Computer Dictionary, 3rd Edition, p. 399.*

* cited by examiner

Primary Examiner—David Hudspeth
Assistant Examiner—K. Wong
(74) Attorney, Agent, or Firm—Michael Zarrabian

(57) ABSTRACT

An apparatus for sustaining data throughput and methods of operating the same result in a drive apparatus that reduces overhead associated with recovery from write faults. The drive apparatus for sustaining data throughput having a file allocation unit including a plurality of sectors for storing data comprises a write controller coupled to the file allocation unit configured to write data to the plurality of sectors, a write fault detector coupled to the write controller and the file allocation unit configured to detect a write fault, and a write fault controller coupled to the write controller, the write fault detector, and the file allocation unit responsive to a detected write fault to skip a defective sector and restart the write controller to continue writing data to the plurality of sectors.

30 Claims, 3 Drawing Sheets

METHOD AND APPARATUS FOR SUSTAINING WRITE THROUGHPUT IN DISK DRIVES

BACKGROUND OF THE INVENTION

1. Field of the Invention

The present invention relates to writing data to disk and more particularly to reducing overhead associated with recovery from write faults encountered during write operations to the disk.

2. Description of the Related Arts

As computer CPU processing speeds continues to increase, data transfer rates become increasing important. Without data being constantly supplied to the computer CPU, a computer system cannot realize its full computational speed potential. Other applications such as multimedia environments require high data transfer rates to support real time video at frame rates of about 30 fps. A video clip sent uncompressed at 24 pictures/second requires raw data rates of about 60 Mbit/s, and a one-minute video clip occupies 448 Mbytes of storage space. For audio tracks, the data rates are not quite as formidable. If the sound track is in stereo and each of the two channels is sampled with 16-bit precision at a 44 kHz sampling rate, the data rate is about 1.4 Mbit/s.

However, modern video compression techniques such as MPEG reduces the storage and data transfer requirements of a storage device that are used in the multimedia environments. Even with advanced compression techniques, sustained data transfers at real time rates are still a challenge. Given that hard disk storage devices are still the most widely used data storage devices, techniques have been developed to address the inadequate data transfer rates. For example, RAID (Redundant Arrays of Inexpensive Disks) systems are commonly employed in multimedia environments to achieve the necessary data transfer rates. RAID systems utilize multiple disk drives that distribute the data between the multiple disk drives so that any one particular drive stores a portion of the total data. RAID systems are very costly and complex to implement and maintain.

A typical disk drive data storage subsystem employs at least one rotating disk and a plurality of positionable data transducer heads known as a head stack. The disks are conventionally mounted in a vertically stacked arrangement upon a common spindle hub. An internal DC brushless spindle motor rotates to spindle hub at predetermined angular velocity. For high performance disk drives with high data transfer rates, it is common to encounter disk speed in the 5500 to 8500 RPM category within 3.5 inch form factor disk drives.

A mass balanced rotary voice coil actuator motor is frequently employed to rapidly move the heads of the head stack in unison. The actuator moves the head stack from a departure track location to a destination location during track seeking operations. Once the head stack has arrived at a destination location, a selected head is settled over the desired data track where data is to be used or stored.

During the data write operation, it is a common occurrence that a write fault is encountered. A write fault or write error to a data track may be due to many conditions but one possible condition is the occurrence of write bumps on the disk. In typical desktop disk drive environments, the disk drive enters into a write retry state where the disk drive controller continues to retry writing to that particular sector. There can be hundreds or thousands of retries depending on the programming of the disk drive controller. After exhausting unsuccessful retries to write data to that particular sector, the bad sector is remapped by assigning a replacement sector. Many instances, the reassigned sector is located away from the current sector on another track. In order for the head stack to locate the reassigned sector, at least one revolution of the disk may need to pass before the head stack can locate the destination track. Thus, by the time the data is written to the reassigned sector, much overhead time has elapsed between the retries and the reassignment of a different sector. Moreover, when it comes time to retrieve the data previously written to the reassigned sector, additional overhead is required to move the head stack to the reassigned sector.

In time critical data applications such as multimedia or AV multi-data streaming environments where sustaining data throughputs are imperative, a disk drive can ill afford the overhead to perform a write fault recovery sequence by performing numerous retries and reassigning a replacement sector for a write fault sector. Current solutions in time critical data applications require investment in expensive RAID systems employing the more costly SCSI (Small Computer System Interface) disk drives.

Therefore, it is desirable to provide an apparatus and methods of operating the same which sustains data throughput to improve data transfer rates of a hard disk drive.

SUMMARY OF THE INVENTION

The present invention provides an apparatus for sustaining data throughput and methods for operating the same which result in improved data transfer rates. The novel improved apparatus is based on reducing overhead associated with an encountered write fault sector. Thus, according to one aspect of the invention, the apparatus for sustaining data throughput having a file allocation unit including a plurality of sectors for storing data, comprises a write controller coupled to the file allocation unit configured to write data to the plurality of sectors. A write fault detector is coupled to the write controller and the file allocation unit configured to detect a write fault. A write fault controller is coupled to the write controller, the write fault detector, and the file allocation unit responsive to a detected write fault to skip a defective sector and restart the write controller to continue writing data to the plurality of sectors.

According to another aspect of the invention, the write fault controller generates a skipped write defect list corresponding to the defective sector. The skipped write defect list includes a sequence of skipped sectors. The write fault controller determines the number of sectors in the sequence of skipped sectors based upon current zone information and the time required to restart the disk controller with the adjusted write transfer sector counts.

According to yet another aspect of the invention, the file allocation unit includes servo wedges positioned between the plurality of sectors for storing data. The servo wedges aid the servo to position a read/write head at a particular location to perform the write operation. Each servo wedge contains information for the servo system to determine the position of the read/write head relative to a track center. Thus, the servo system adjusts the position of the read/write head based on information from the servo wedge. The write controller writes data beginning at a servo wedge. The write fault detector detects the write fault at a particular servo wedge.

An apparatus and method for sustaining data throughput are provided by reducing overhead associated with handling an encountered write fault sector. Sustained data throughput is achieved through skipping the write fault sector and continuing the write operation. A skipped write defect list tracks the skipped sectors. In a subsequent read operation, the write defect list allows the read operation to efficiently skip over those sectors that were skipped in the write operation in response to the write defect list. Accordingly, efficient handling of encountered write faults substantially reduces overhead associated with an encountered write fault to enable sustained data throughput. The novel approach to handling encountered write faults provides a low cost solution for meeting the demands of multi-data streaming environments.

Other aspects and advantages of the present invention can be seen upon review of the figures, the detailed description, and the claims which follow.

DETAILED DESCRIPTION OF THE INVENTION

Figure 1:
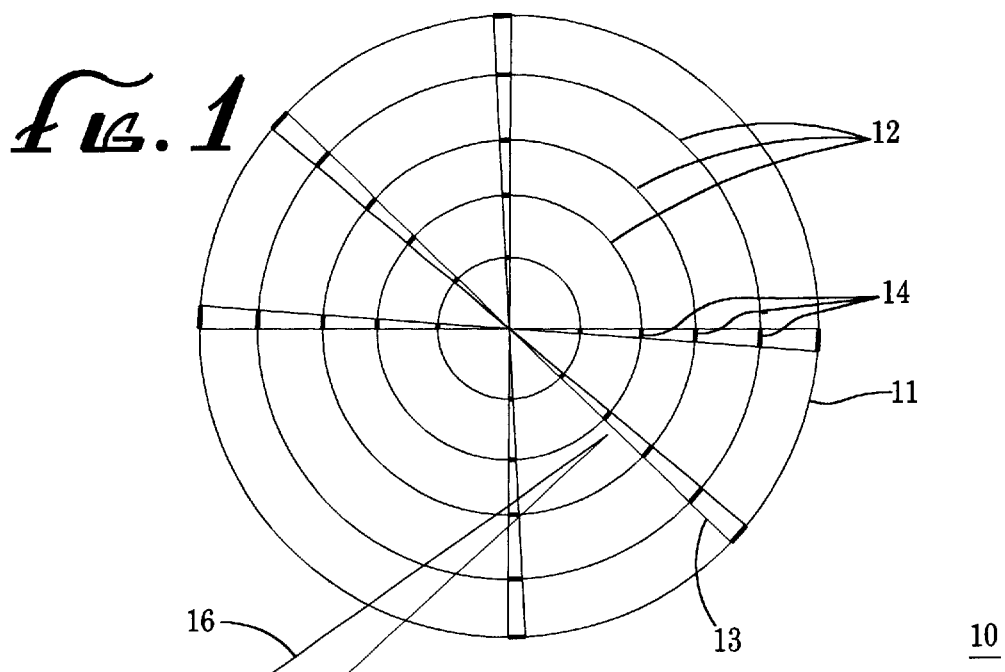
FIG. 1 illustrates an embodiment of a disk drive for sustaining data throughput according to the present invention.
Figure 3:
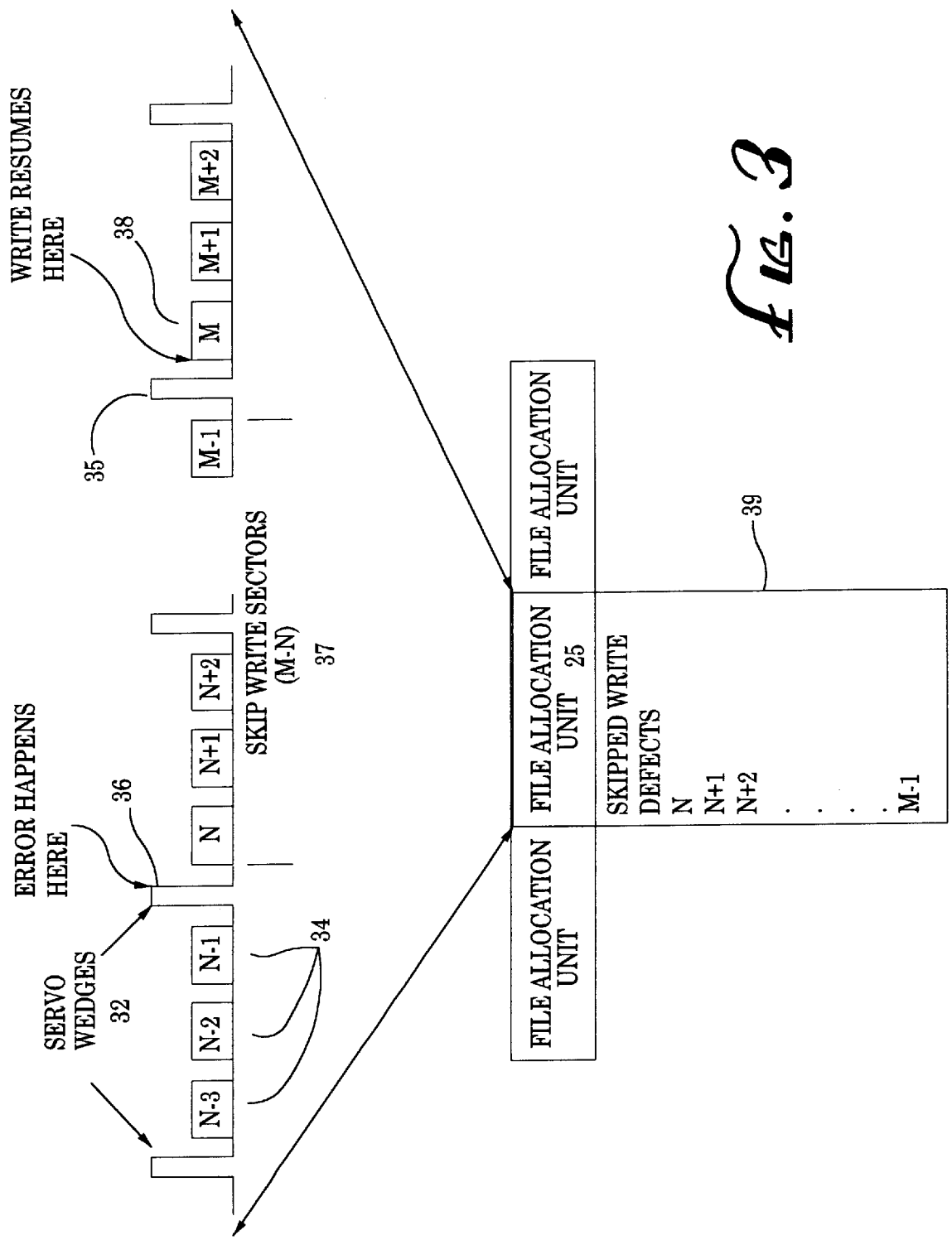
FIG. 3 illustrates a simplified diagram of a file allocation unit.

The invention will be described with respect to the Figures in which FIG. 1 generally shows an embodiment of a disk drive 10 for sustaining data throughput according to the present invention. The disk drive 10 includes a least one disk 11, a read/write head 16, a disk drive controller 17, a write fault detector 18, and a write fault controller 19. The disk 11 includes a plurality of tracks 12. Embedded in each track 12 are servo wedges 14 containing servo information. Servo wedges 14 are embedded in a radial pattern, as shown in FIG. 1, forming the appearance of a spoke 13. Between each pair of servo wedges 14 includes a plurality of sectors (not shown) that store data. The servo wedges 14 serve to enable a servo software system (not shown) to position the read/write head 16 at a particular radial location of a particular track during read and write operations. Each servo wedge 14 contains information for the servo system to determine the position of the read/write head 16 relative to a track center. Thus, the servo system enables the adjustment of the position of the read/write head 16 based on information of the servo wedge 14. The disk 11 includes a plurality of file allocation units. Each file allocation unit includes a plurality of servo wedges and a plurality of data sectors positioned between each pair of servo wedges. FIG. 3 illustrates a diagram of a file allocation unit.

During a write operation, the disk drive controller 17 controls positioning of the read/write head 16 via the servo system as data is stored to the disk 11. The write fault detector 18 detects a write fault sector which occurs during a write operation. The write fault sector may be due to many conditions but one possible condition is the occurrence of write bumps on the disk 11. In response to the detected write fault sector, the write fault controller 19 directs the disk drive controller 17 to skip a number of sectors starting from the detected write fault sector. The number of sectors skipped depends on the position of the read/write head on the disk and the time it takes for the servo system to recover from the write fault. In a present embodiment, when the read/write head is positioned in close proximity to the inner tracks of the disk, one to three sectors may be skipped. When the read/write head is positioned along the outer tracks of the disk, 10–15 sectors may be skipped. The disk drive controller 17 restarts and continues the write operation to write the remainder of the data within the same revolution to the disk 11. The write fault controller 19 creates a write defect list associated with a current file allocation unit. The write defect list includes information regarding the number of sectors that have been skipped by the disk drive controller 17 as a result of the detected write fault sector.

The number of sectors skipped in the write defect list corresponds to the amount of overhead for the write fault controller 19 to 1) calculate the usable sector size of a current file allocation unit, 2) adjust the number of sectors to write for the current file allocation unit, and 3) reprogram the disk controller 17 to restart write transfer to the disk 11. A file allocation unit with skipped defects has different usable sector size but its total size remains unchanged. The total size of a write skipped file allocation unit remains unchanged so that it does not alter the logical block address. Moreover, the disk drive 10 has its own native file management capabilities that include maintaining its own file allocation units and file allocation tables for the stored contents.

Figure 2:
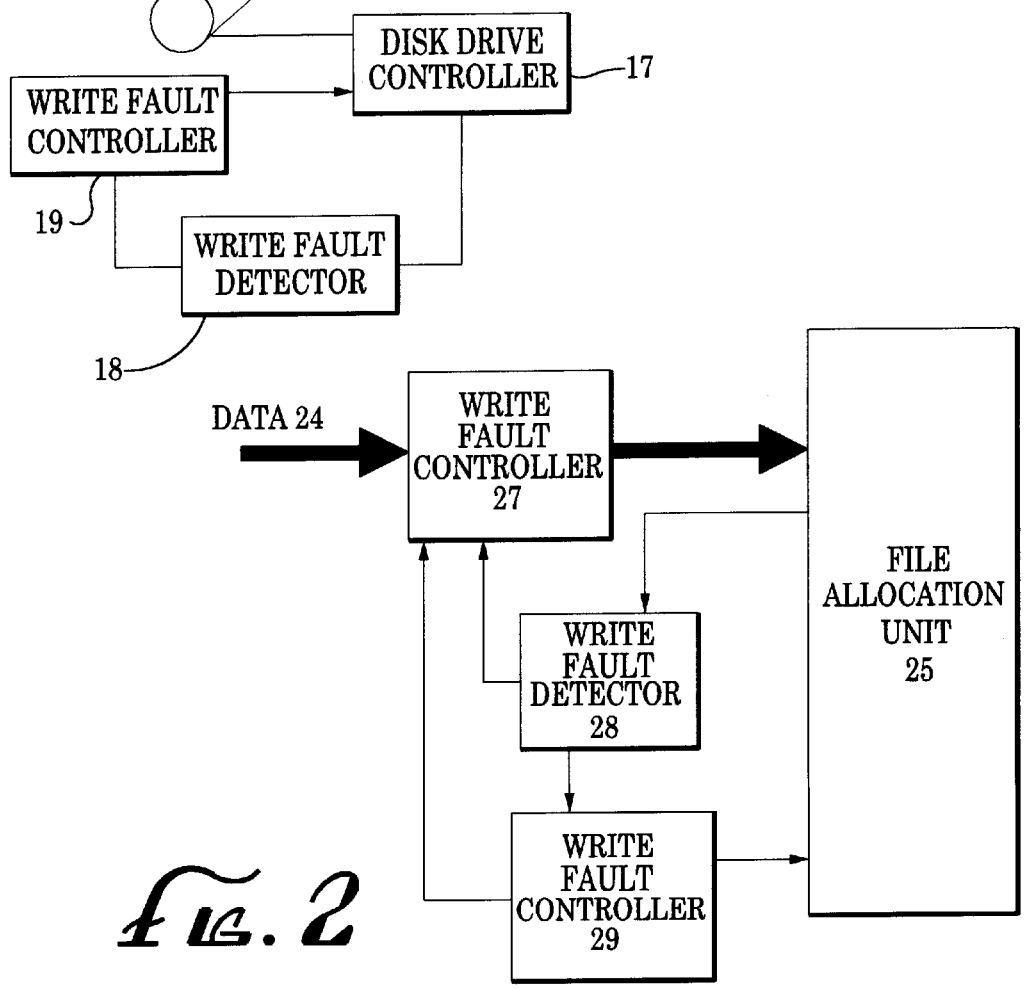
FIG. 2 illustrates a block diagram of the disk drive for sustaining data throughput.

FIG. 2 illustrates a block diagram of a write operation to a file allocation unit 25 that encounters a write fault. A disk write controller 27 receives data 24 and writes the data 24 to the file allocation unit 25. A write fault detector 28 is coupled to the file allocation unit 25, the disk write controller 27, and the write fault controller 29. The write fault controller 29 is coupled to the file allocation unit 25 and the write controller 27. In operation, as the disk write controller 27 writes the data 24 to the file allocation unit 25, the write fault detector 28 checks for write faults. When the write fault detector 28 detects a write fault sector from the data 25 being written to the file allocation unit 25, the write fault detector 28 signals the disk write controller 27 and the write fault controller 29. The disk write fault controller 27 halts writing data to the file allocation unit 25. In an alternative embodiment, the disk write controller 27 retries writing data to the same location a predetermined number of times before the disk write controller 27 halts. Depending on the size of the SDRAM write buffer, retries to a write fault sector may range from one to three times.

In response to a detected write fault sector from the write fault detector 28, the write fault controller 29 determines a number of sectors to skip and creates a write defects list associated with the file allocation unit 25. The write fault controller 29 signals the disk write controller 27 to restart writing the remaining data 24 skipping a plurality of sectors associated with the write fault sector that corresponds to the write defects list. The disk write controller 27 also receives the write defects list from the write fault controller 29 and writes the write defects list to a private data area (not readily accessible to the user). In the present invention, the write defects list is stored in the drive system cylinders or negative cylinders.

FIG. 3 illustrates a file allocation unit 25 in accordance with the present invention. The disk 11 includes a plurality of file allocation units 25. Each file allocation unit 25 includes a plurality of servo wedges 32 and plurality of sectors 34 between each pair of servo wedges 32. As the disk write controller 27 writes the data 24 to the file allocation unit 25, the data 24 is written to sectors N-3, N-2, and N-1

34 before the write fault controller 29 detects a write fault sector at servo wedge 36. The write fault controller 29 skips a plurality of skip write sectors M-N 37 and restarts the disk write controller 27 to resume writing at sector 38. Accordingly, the disk write controller 27 positions the read/write head 16 at servo wedge 35 to resume the write operation of the data 24 to the file allocation unit 25. When the write fault controller 29 encounters skip sectors that are near the end of a track, the write fault controller 29 directs the write controller 27 to resume write operations beginning from the next track. In such situations, completion of the write operation takes an additional disk revolution. The write fault controller 29 also generates a skipped write defects list 39 that the write controller 27 writes to a private data area (not generally accessible to the user) on the disk 11. Later read operations retrieves the write defects list 39 to skip the previously skipped write sectors.

Figures 4, 5:
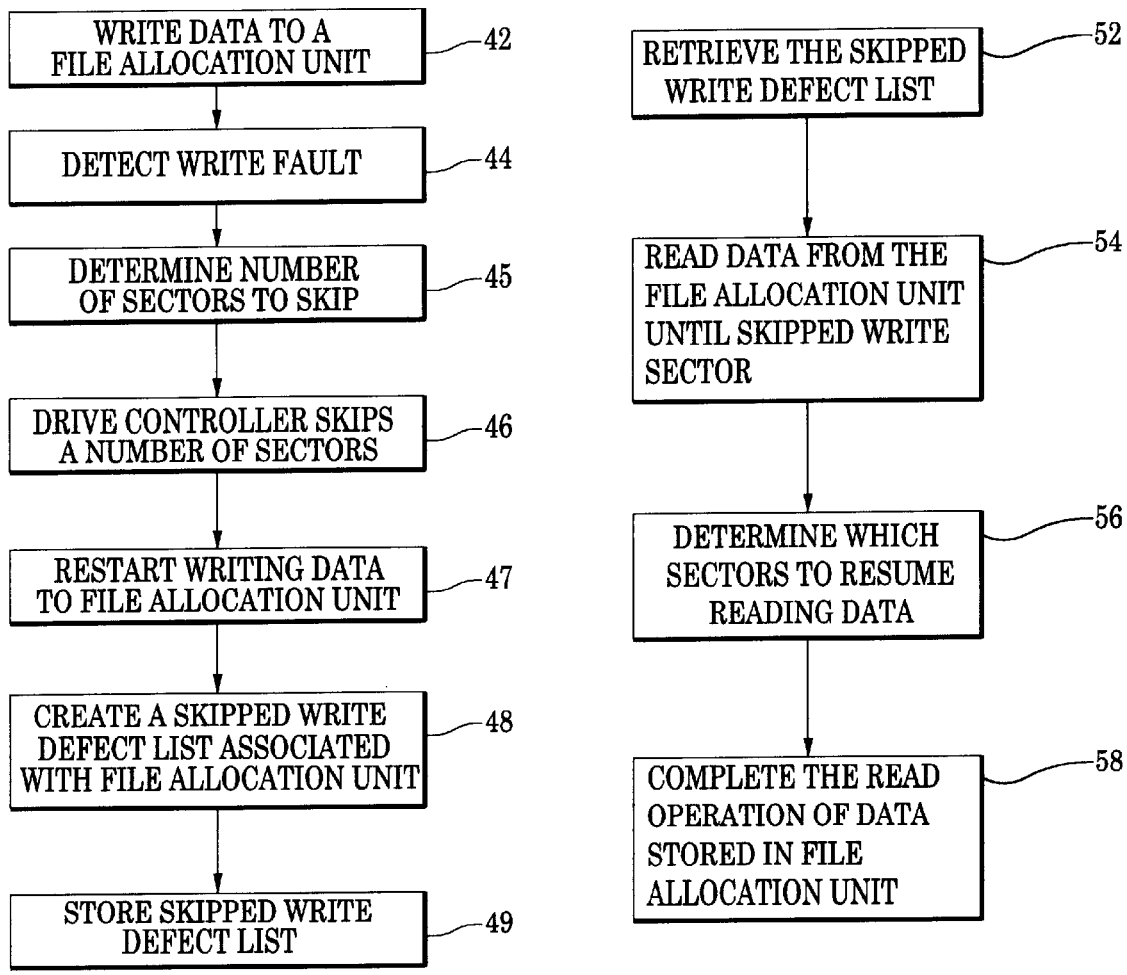
FIG. 4 illustrates a flow diagram of writing data to a file allocation unit according to the present invention.
FIG. 5 illustrates a flow diagram of reading data from a file allocation unit according to the present invention.

FIG. 4 illustrates a flow diagram for sustaining data throughput to a file allocation unit in accordance with the present invention. The flow diagram begins with step 42 in which the disk drive controller writes data to a file allocation unit. In step 44, the write fault detector detects a write fault associated with data written to the file allocation unit. Next, the write fault controller determines a particular number of sectors to skip in step 45. The number of sectors the write fault controller skips is based on current zone information and the time required to restart the disk drive controller with the adjusted write transfer sector counts. In step 46, the disk drive controller positions the read/write head based on the number of sectors to be skipped. The disk drive controller restarts writing data to the file allocation unit in step 47. Next, in step 48, the write fault controller creates a skipped write defect list associated with the file allocation unit. The flow diagram ends with step 49 where the disk drive controller saves the skipped write defect list to a private data area on the disk.

FIG. 5 illustrates a flow diagram for reading data from a file allocation unit having a skipped write defect list associated with the file allocation unit. The flow diagram begins with step 52 where the disk drive controller retrieves the skipped write defect list from a private data area on the disk. Next, the disk drive controller reads data from the file allocation unit until the disk drive controller encounters a skipped write sector in step 54. Step 56 provides that the disk drive controller determines where to position the read/write head to resume reading data from the file allocation unit based upon the write defect list. The flow diagram ends with step 58 where the disk drive controller completes reading data stored in the file allocation unit.

As particular data stored in a file allocation unit is deleted, the disk drive controller also unlinks the corresponding write defect list to that particular file allocation unit. Thus, in subsequent write operations the disk drive controller reclaims those previously skipped write defect sectors as usable sectors. Contrast with factory defects where the factory defect remains as defective sectors throughout the life of the disk drive and where those factory defects are permanently reassigned to other replacement sectors.

While the foregoing detailed description has described embodiments of the apparatus and methods for sustaining data throughput in a disk drive, it is to be understood that the above description is illustrative only and not limiting of the disclosed invention. Obviously, many modifications and variations will be apparent to the practitioners skilled in this art. Accordingly, the apparatus and methods for sustaining data throughput in a disk drive have been provided. During write operations, skipping write fault sectors and restarting the write operation after skipping a plurality of sectors greatly enhances data write throughputs in a multi-data streaming environment. Moreover, during read operations, the disk controller retrieves the generated skipped write defect list to efficiently position the read/write head to skip over the plurality of sectors corresponding to the write defect list. Thus, the apparatus and methods for sustaining data throughput in a disk drive greatly reduce overhead associated with sector reallocations from write fault sectors and enhance read and write throughputs of the disk drive.

What is claimed is:

1. An apparatus for sustaining data throughput having a file allocation unit including a plurality of sectors for storing data, comprising:
   a write controller coupled to the file allocation unit configured to write data to the plurality of sectors;
   a write fault detector coupled to the write controller and the file allocation unit configured to detect a write fault; and
   a write fault controller coupled to the write controller, the write fault detector, and the file allocation unit, the write fault controller responsive to a detected write fault to skip a defective sector and restart the write controller to continue writing data to the plurality of sectors to sustain data throughput at preferred data transfer rates.

2. The apparatus for sustaining data throughput of claim 1, wherein said write fault is associated with a target sector comprising said defective sector.

3. The apparatus for sustaining data throughput according to claim 1, wherein the write fault controller generates a skipped write defect list corresponding to the defective sector.

4. The apparatus for sustaining data throughput of claim 2, wherein the skipped write defect list includes a sequence of skipped sectors.

5. The apparatus for sustaining data throughput of claim 1, wherein the file allocation unit includes servo wedges positioned between the plurality of sectors for storing data.

6. The apparatus for sustaining data throughput of claim 5, wherein the write controller writes data beginning at a servo wedge.

7. The apparatus for sustaining data throughput of claim 6, wherein the write fault detector detects the write fault at a particular servo wedge.

8. The apparatus for sustaining data throughput of claim 1, wherein:
   said defective sector comprises a previously undetected defective sector, and
   the write fault detector detects a write fault associated with said previously undetected defective sector.

9. A disk drive for sustaining data throughput having disk for storing data, the disk having file allocation units including a plurality of sectors to store data, the disk drive comprising:
   a read/write head for reading from and writing data to the plurality of sectors;
   a disk drive controller configured to control placement of the read/write head over the disk;
   a write fault detector coupled to the disk drive controller and the file allocation unit configured to detect a write fault; and
   a write fault controller coupled to the disk drive controller, the write fault detector, and the file allocation unit, the write fault controller responsive to a detected write fault to skip a defective sector and restart the disk drive controller to continue writing data to the plurality of sectors to essentially sustain data throughput at one or more data rates.

10. The disk drive for sustaining data throughput of claim 9, wherein the file allocation unit includes servo wedges positioned between the plurality of sectors for storing data.

11. The disk drive for sustaining data throughput of claim 10, wherein the disk drive controller positions the read/write head at a servo wedge to begin data writes to the plurality of sectors.

12. The disk drive for sustaining data throughput of claim 9, wherein the write fault controller generates a skipped write defect list corresponding to the defective sector.

13. The disk drive for sustaining data throughput of claim 12, wherein the disk drive controller repositions the read/write head to correspond with skipped sectors in the skipped write defect list.

14. The disk drive for sustaining data throughput of claim 13, wherein the skipped write defect list includes a sequence of skipped sectors.

15. The disk drive for sustaining data throughput of claim 12, wherein the disk drive controller positions the read/write head in response to the skipped write defect list to skip the defective sector during a read operation.

16. The disk drive for sustaining data throughput of claim 15, wherein the disk drive controller positions the read/write head at a particular servo wedge to perform the read operation.

17. The disk drive for sustaining data throughput of claim 9, wherein said write fault is associated with a target sector comprising said defective sector.

18. The disk drive for sustaining data throughput of claim 9, wherein the write fault controller skips one or more sectors starting from said defective sector, such that the number of skipped sectors depends at least on the position of the head relative to the disk, thereby sustaining data throughput.

19. The disk drive for sustaining data throughput of claim 9, wherein the write fault controller skips one or more sectors starting from said defective sector, such that the number is skipped sectors depends at least on the position of the head relative to the disk and a time period for the disk drive controller to recover from the write fault, thereby sustaining data throughput.

20. The disk drive for sustaining data throughput of claim 9, wherein:
    said defective sector comprises a previously undetected defective sector, and
    the write fault detector detects a write fault associated with said previously undetected defective sector.

21. A method for sustaining data throughput from disk having a file allocation unit including a plurality of sectors for storing data comprising the steps of:
    writing data to the plurality of sectors;
    detecting a write fault associated with a defective sector;
    skipping the defective sector;
    generating a skipped write defect list corresponding to skipped sectors; and
    restart writing the data to the plurality of sectors from the skipped sectors to essentially sustain one or more preferred data throughput rates.

22. The method of sustaining data throughput of claim 21, wherein the file allocation unit further comprises servo wedges between the plurality of sectors for storing data and wherein the steps of writing the data to the plurality of sectors begins from a particular servo wedge.

23. The method of sustaining data throughput of claim 22, wherein the step of detecting a write fault occurs at the particular servo wedge.

24. The method of sustaining data throughput of claim 22, wherein the step of skipping the defective sector includes the step of skipping at least one servo wedge.

25. The method of sustaining data throughput of claim 22, wherein the step of generating the skipped write defect list includes the step of storing the skipped write defect list to the disk.

26. The method of sustaining data throughput of claim 22, wherein the step of restart writing the data includes the step of writing the data at the particular servo wedge.

27. The method of sustaining data throughput of claim 21, wherein said write fault is associated with a target sector comprising said defective sector.

28. The method of sustaining data throughput of claim 21, wherein:
    said defective sector comprises a previously undetected defective sector, and
    the step of detecting said write fault further comprises the steps of detecting a write fault associated with said previously undetected defective sector.

29. The method of sustaining data throughput of claim 21, further including the steps of sustaining a preferred data throughput rate.

30. The method of sustaining data throughput of claim 21, further comprising the steps of:
    performing a read operation of data stored in the file allocation unit, including the steps of: reading data from the file allocation unit until a skipped write sector, using the write defect list to determine sectors to resume reading data from, and completing the read operation of data stored in the file allocation unit.

* * * * *